US010098186B2

(12) United States Patent
Goutiere et al.

(10) Patent No.: US 10,098,186 B2
(45) Date of Patent: Oct. 9, 2018

(54) HEATED WINDSCREEN

(71) Applicant: AGC GLASS EUROPE, Louvain-la-Neuve (BE)

(72) Inventors: Laurent Goutiere, Court-Saint-Etienne (BE); Peter Masschelein, Huldenberg (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 95 days.

(21) Appl. No.: 15/103,762

(22) PCT Filed: Dec. 8, 2014

(86) PCT No.: PCT/EP2014/076901
§ 371 (c)(1),
(2) Date: Jun. 10, 2016

(87) PCT Pub. No.: WO2015/101462
PCT Pub. Date: Jul. 9, 2015

(65) Prior Publication Data

US 2016/0316521 A1 Oct. 27, 2016

(30) Foreign Application Priority Data

Dec. 11, 2013 (BE) .................................. 2013/0832

(51) Int. Cl.
*B60L 1/02* (2006.01)
*H05B 3/86* (2006.01)
(Continued)

(52) U.S. Cl.
CPC ................ *H05B 3/86* (2013.01); *H05B 3/12* (2013.01); *H05B 3/84* (2013.01);
(Continued)

(58) Field of Classification Search
CPC ... H05B 3/84; H05B 3/86; H05B 3/12; H05B 2203/002; H05B 2203/007;
(Continued)

(56) References Cited

U.S. PATENT DOCUMENTS

| | | | |
|---|---|---|---|
| 2002/0015824 A1 | 2/2002 | Kawamoto et al. | |
| 2012/0000896 A1 | 1/2012 | Phan et al. | |
| 2012/0152930 A1* | 6/2012 | Chamberlain ........... | H05B 3/84 219/203 |

FOREIGN PATENT DOCUMENTS

| | | |
|---|---|---|
| DE | 10 2009 025 888 A1 | 12/2010 |
| DE | 10 2012 018 001 A1 | 5/2013 |

(Continued)

OTHER PUBLICATIONS

International Search Report dated May 8, 2015 in PCT/EP14/076901 Filed Dec. 8, 2014.

*Primary Examiner* — Shawntina Fuqua
(74) *Attorney, Agent, or Firm* — Oblon, McClelland, Maier & Neustadt, L.L.P.

(57) ABSTRACT

A heated laminated windscreen including two sheets of glass joined by an inserted sheet, and including a system of conductive layers covering most of a surface of one glass sheet of the windscreen. The system is electrically powered by busbars at a top and bottom of the windscreen, with windows which are devoid of layers arranged at the top in the middle of the windscreen. The windscreen further including at least one additional busbar arranged laterally on edges and at the top of the windscreen.

16 Claims, 6 Drawing Sheets

(51) Int. Cl.
*H05B 3/12* (2006.01)
*H05B 3/84* (2006.01)

(52) U.S. Cl.
CPC .. *H05B 2203/008* (2013.01); *H05B 2203/011* (2013.01); *H05B 2203/013* (2013.01); *H05B 2203/037* (2013.01)

(58) Field of Classification Search
CPC ........ H05B 2203/011; H05B 2203/013; H05B 2203/031; H05B 2203/017; H05B 2203/008; H05B 2203/037; B32B 17/10036; B32B 17/10293; B32B 17/10761; B32B 17/10; B32B 2367/00; Y10T 29/49002
See application file for complete search history.

(56) References Cited

FOREIGN PATENT DOCUMENTS

| | | | |
|---|---|---|---|
| EP | 1 168 888 | A2 | 1/2002 |
| JP | 3-54047 | A | 3/1991 |
| WO | 2011/023974 | A2 | 3/2011 |

* cited by examiner

HEATED WINDSCREEN

The invention relates to windshields which comprise an electrically conductive system of thin layers.

Windshields of this type are those that were initially developed to impart properties of filtering infrared radiation. The systems in this case comprise one or more metal layers essentially based on silver combined with dielectric layers which, on the one hand, protect the metal layers and, on the other hand, correct the effects of these layers on the transmitted spectrum and above all the reflected spectrum, so that these are of as "neutral" a color as possible.

Electrically conductive systems of layers are also proposed in order to heat the windshield for the purpose of demisting it or defrosting it. In this application, one well-known difficulty is the need to achieve layers having a resistance that is low enough to make it possible to have an appropriate power. The developed power is limited by the voltage available on the vehicle, in general 12-14 V, on the one hand and, on the other hand, due to the need to maintain the thickness of the metal layer(s) such that the light transmission in the visible wavelength range remains sufficient to meet the regulatory requirements in this field, 70% or 75% depending on the country.

Obtaining the powers required for defrosting under adequate speed conditions is often at the limit of the technical capabilities, in particular due to the increasing dimensions of modern windshields. The improvements in conductive layers, which meet the light transmission conditions, in terms of resistance are no longer advancing sufficiently to keep up with this increase in size.

The need to have, on the surface of the windshield, an area of higher power per unit of surface area has led to various solutions. Among these, several propositions hinge on the idea of bringing closer the supply conductors, which are then no longer at the edge of the windshields but move into the area that is normally the viewing area. It is a question, for example, of stretching a set of very fine wires from the "busbar" properly positioned in its customary position.

This solution in part goes back to a structure in which there is no conductive layer, the wires themselves forming a heating network which extends from one busbar to the other over the entire height of the windshield. The drawback of this solution is of course making wires visible which, although they contribute only partially to the heating, remain visible and are therefore detrimental to the uniform appearance, which leads to the heating layers being preferred.

Still with the idea of bringing the busbars closer, it has also been proposed to use enamel strips that cover the edges of the glazings and especially in the upper portion of the windshield according to a non-uniform distribution, starting from a complete coverage toward a gradual gradation on moving further away from the edge. The proposition is then to use a conductive enamel composition. This solution does not make it possible to significantly reduce the distance actually separating the boundary of this enamelled area from the other busbar. Otherwise the viewing area would itself be reduced.

The objective of the invention is to resolve the difficulties mentioned above. The windshields according to the invention are as described herein.

The invention is based on the idea that the heating of the windshield may not be uniform. The manufacturers demand a certain speed for obtaining the temperature at which frost in particular disappears. However, the entire surface of the windshield does not necessarily need to reach this temperature at the same time. Over the surface of the windshield, a distinction is always made between various areas according to the viewing condition that these areas should exhibit. This distinction appears in United Nations standard R43. The areas referred to as A are those for which no obstacle to vision should be encountered. Added to these areas are these areas B and C, and optionally D, for which, and in this order, the requirements are less strict. FIG. 1 schematically represents the location of these areas A, B, C.

Although efforts were previously directed toward obtaining heating that is as uniform as possible over the entire surface (apart from the solutions mentioned above), the invention, without neglecting the need for heating that is as uniform as possible, favors obtaining a good location of the areas that are most rapidly heated. These areas are of course the main viewing areas, especially the area A and the area B. The favored heating of these areas should not introduce, into the field of vision, elements that break up the appearance of uniformity of the glazing.

The presence of conventional busbars at the top and at the bottom of the windshield, with those, according to the invention, that extend over a certain height over the side and preferably essentially in the upper portion of these sides, significantly changes the electric current distribution lines. For a conductive layer of uniform quality over the entire surface, these lines naturally have a tendency to follow the shortest paths. In the presence of these portions of busbars in the side areas, a more intense heating is consequently observed laterally but not exclusively in the immediate continuation of the busbars in question.

It is noteworthy, especially for the windshields that are proposed currently, to observe that due to multiple functional elements present on the windshield, windows for electronic toll collection, rain sensors, light sensors, an infrared camera, etc., the heating layer is no longer present uniformly over the entire surface of the windshield. This results in heating that is also not uniform even if arrangements endeavor to minimize the existing differences. It should especially be emphasized that the lack of uniformity due to the position of the windows in question does not spare the main viewing areas when the discontinuities are located between the two opposing busbars, therefore in the path of the current lines.

Furthermore, the presence of these windows in the conventional modes necessarily being located in the vicinity of the edge of the windshield leads to an inevitable concentration of the current lines around these windows. This concentration, barring specific measures which the prior art also mentions, leads to local overheating that is damaging to the good performance of the components of the windshield. The temperature increase may impair the quality of the thermoplastic interlayer products and lead to a partial delamination.

The arrangements according to the invention lead not only to a better location of the areas that are heated most quickly, but reduces the presence of these local overheating points in the most sensitive areas of the windshield, those where all the functional elements indicated above are located.

The busbars located laterally preferably extend over a height of the windshield which extends approximately to the level of the boundary of the area A and preferably of the area B. This approach results, as shown by the examples, in a lower heating especially in area C, the area for which the requirement in terms of vision is lowest.

Several configurations regarding the arrangement of the busbars meet the objectives of the invention.

The conventional arrangement comprises a busbar extending at the top and at the bottom of the windshield practically over the entire width thereof. One embodiment of the invention derived from this arrangement results in continuously lengthening the busbar located in the top position by portions that extend along the edges in the height of the windshield. The same voltage is then necessarily applied in all the top and side busbars. It is possible to separate the power supply of the busbar in the upper portion of the windshield and those arranged laterally. This makes it possible, where appropriate, to apply different voltages. In the latter case, it is preferred to keep the top busbar at the highest potential. A lower application to the side busbars results in a lower heating at the ends of these busbars, reducing the hot spots at these ends, but at the same time also reducing the benefit of the presence of these busbars for increasing the heating desired according to the invention. There is therefore, in all cases, a compromise between these two tendencies.

The side busbars are advantageously symmetrical with respect to the axis of the windshield. Nevertheless, an asymmetrical arrangement may be preferred. In this case, the preferred arrangement is that which provides the fastest heating in the viewing area facing the driver. In order to obtain this specific effect, the side busbar on the driver's side may be the only one, or else the one that extends lowest from the busbar in the top position. This mode lends itself to all variations that make it possible to adjust the asymmetry of the heating to a greater or lesser extent.

The continuity of the busbar is firstly that of the voltage applied. It is possible to only form an electrical continuity, by connecting the busbars in the top position to the side busbar(s) via a conductor which is not necessarily of the same composition as that forming the actual busbar. This arrangement facilitates the application of the busbars, when these are formed of metal strips. These strips do not easily lend themselves to following the perimeter of the windshield in the corners thereof. A joining wire extending between two metal strip elements avoids this difficulty. Furthermore, the absence of structural continuity of the busbar is not a hindrance as regards the distribution of the current lines insofar as the corner does not favor large numbers of these lines.

When the windshield, as is most common, comprises areas in which the heating layer is absent for the reasons recalled above, it is preferable to arrange a small busbar locally under these layer-free areas, this busbar being preferably connected to the main busbar in the top position. This additional busbar is advantageously located level with the bottom end of the side busbars. In this case, it is preferred to bring these various busbars to the same potential.

The busbar in the top position, as indicated previously, conventionally extends over the entire width of the windshield. This arrangement is not always necessary. It is possible to arrange separate sections connected to one another as indicated above with regard to the side elements. Still in the top position, the busbar, or the elements that form it, does not necessarily extend over the entire width. As also indicated previously, the top "corners" of the windshield do not have very intense current lines, and it is not necessary for these busbars to extend right into the corners.

In the presence of areas not covered by the conductive layer, in order to maintain a distribution of the current lines that is not too disrupted, it is advantageous, as proposed previously, to arrange a busbar element under these "windows" made in the layer. This element is hidden in the portions masked from view by enamels applied for this purpose. Where appropriate, if this element, which is ordinarily found at the center, can extend sufficiently into the width of the windshield, it may form, by itself alone, the busbar of the top of the windshield. Nevertheless most often, the main busbar located on the edge at the top of the windshield is combined with this additional element. The voltage applied to this element in this case may be either the same as that of the main busbar or adjusted to ensure that this voltage is substantially lower and therefore limits an excessively high concentration of current lines starting from this element. It is possible in particular to endeavor to adjust the voltage applied so that it is more or less uniform over the width of the windshield where this busbar element is located.

The invention is described in detail by referring to the pages of drawings, in which:

FIG. 1 schematically represents, as a front view, the structure of a conventional heated windshield;

Figure 1:
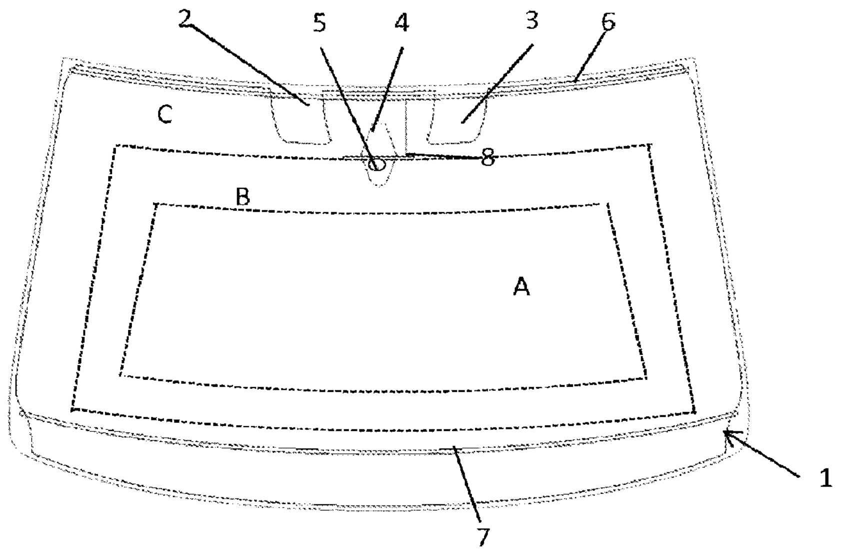

The representation of the windshield from FIG. 1 is limited to the elements necessary for the description of the invention.

On the windshields, the heating layer is as described in numerous prior publications. It is a question of achieving the best results, namely the smallest possible sheet resistance of sets of metal layers protected by dielectric layers. The best performing systems comprise two, three or even four silver layers. Under the best conditions, the heating layers achieve sheet resistances of the order of 1 Ω/□ or less. Despite these very small resistances, the actual dimensions of the windshields often exceeding one meter in height do not make it possible to obtain the power required in order to meet the needs of the manufacturers. This power is of the order of 400 $W/m^2$, using the potentials available on private vehicles (12-14 V).

FIG. 1 shows the conventional arrangement of the heating layer which extends over virtually the whole of the surface of the glazing. The boundary of the layer is marked by the line 1. Only the edges of the glazing are not in contact with the conductive layer in order to avoid possible impairments by contact with ambient moisture.

The conductive layer is also interrupted at the location of various devices conventionally present. This is the case for example for that which is customarily denoted by the name telecommunication window 2, 3, of electronic toll collection type, or windows for driving assist cameras, especially night driving assist cameras, 4. The windows in question are made in order to let through waves, especially infrared waves, which do not cross, or are excessively attenuated by, the conductive layers incorporated in the heating system of layers.

Other areas of the windshield may also be free of layers, such as the locations of rain sensors 5 when they also operate by infrared radiation. Generally, the heating systems of layers blocking a substantial portion of the infrared transmission, any instrument requiring the transmission in question, the area in which this instrument operates is free of the system of layers.

In order to power the system of layers, the windshield comprises “busbars” 6, 7 formed of conductors that are weak enough to conserve as much as possible the power available for the elements directly of use in heating the windshield. These busbars are conventionally either metal strips or strips of conductive enamelled pastes.

The main busbars are positioned on the top and bottom edges of the sheet 1. This arrangement is chosen so as to limit the distance that separates them in order to reduce the resistance between these busbars and increase the available power per unit of surface area for a limited available potential difference.

The busbars 6 and 7 are connected by means of connectors (not shown) to the electric power supply.

The busbar 7 in the bottom portion is often at a distance from the lower edge of the glazing in order to make, according to modes described previously, a particular heating area for the resting of the windshield wipers. These arrangements are not represented in the interests of clarity.

The windshields ordinarily comprise enamelled portions intended to mask all of the busbars and the beads of adhesive for attaching the windshield to the body. The enamelled masking areas are positioned at position 2 on the outer sheet according to the conventional designation of the faces of the glass sheets of a laminated assembly.

The enamelled area extends beyond the edges at the locations that receive the supports for the interior rearview mirror and other devices such as a camera, which supports are often adhesively bonded to the windshield.

The presence of the various areas without a heating layer very significantly modifies the distribution of the current lines around these areas and in the continuation thereof in the direction of the busbar 7 located at the bottom of the windshield. Consequently, the heating cannot be uniformly provided in the vicinity of these areas. In order to to minimize this lack of uniformity, according to the arrangements described previously, an additional busbar 8 is positioned in the area masked by the enamel and beneath the main layer-free areas. The busbar 8 is electrically coupled to the busbar 6. This coupling may in addition adapt the potential of the busbar 8 so that it is more or less that which the layer would have at this level, in the absence of these windows. In other words, it is endeavored to re-establish the same potential over the entire width of the sheet for a certain uniformity of the current in the direction of the bottom of the windshield. In order to obtain this result, the prior art proposes to connect the busbars 6 and 8 via a conductor having substantially the same resistance as the layer between these same busbars.

Represented schematically in FIG. 1 by dotted lines are the viewing areas that are distinguished following the regulations. These are respectively the area A, the one that is the most directly affected, for the vision of the driver. The area B is bigger than the preceding area, which it encompasses entirely. This area covers practically all the portions of the glazing that are not masked. The remainder of the surface corresponds to the area C.

As indicated above, the objective of the invention is to favor a differentiated heating. The priority is to obtain the heating of the area A as quickly as possible.

Figure 2:
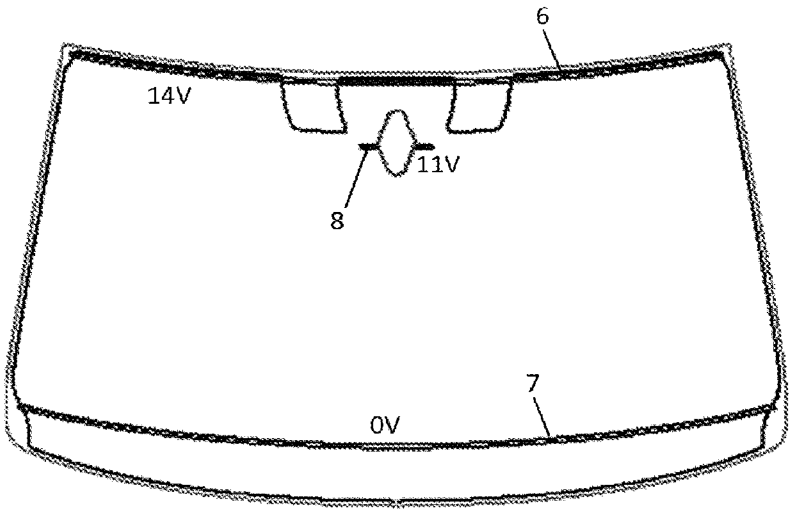
FIG. 2 is a representation analogous to FIG. 1 illustrating the prior arrangements that tend to make the heating of the windshield uniform.
Figure 3:
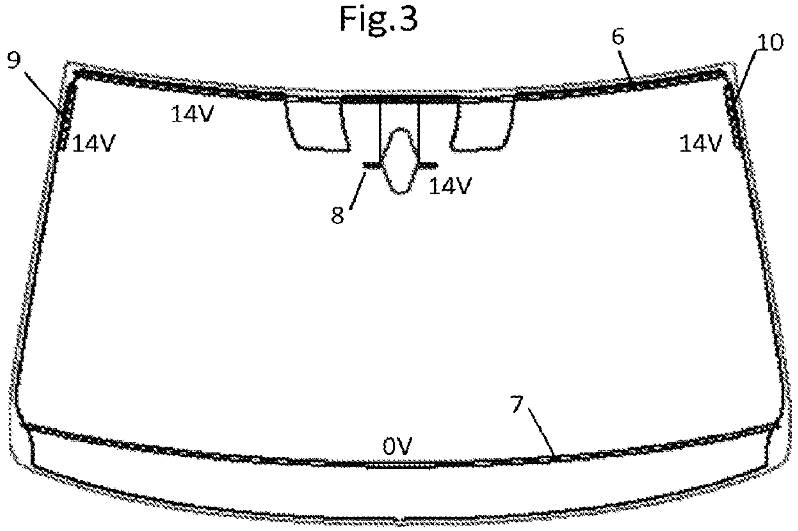
FIG. 3 represents a windshield comprising elements analogous to those from FIG. 2, but incorporating arrangements according to the invention.

By way of example of implementation of the invention, a comparison is made between the operation of a windshield of conventional type represented in FIG. 2 and of a windshield according to the invention in FIG. 3.

In FIG. 2, the potential of the various busbars has been indicated. The busbar 7 is grounded (0 V). The busbar 6 of the upper edge is at 14 V. The additional busbar 8 is at around 11 V.

The same windshield is equipped in the manner represented in FIG. 3. In this figure, the upper busbar 6 is extended over the sides by two portions 9 and 10 which are at the same potential of 14 V. Likewise, the busbar 8 is at 14 V tending to reproduce, in a certain manner, an equipotential area level with the ends of 9 and 10 on the one hand and of the busbar 8 on the other hand.

The two windshields are compared under their heating conditions.

For the comparative test, the heating system of layers used is that described in Belgian patent application no. 2011/0218 filed on Apr. 12, 2011. It is an assembly comprising several thin layers of silver with dielectric layers that protect these metal layers. The resistance R/□ of the layer is 0.786 Ω/□.

The test windshield is composed of two glass sheets having a thickness of 2.1 mm for the outer glass and 1.6 mm for the inner glass, and of a PVB sheet having a thickness of 0.76 mm. The heating layer is at position 3 in the laminate.

The temperatures are measured at the surface on the outside of the glazing. The initial temperature is 20° C. The external and internal convection provided by the air dissipates a power of 10 $W/m^2K$.

Figure 4:
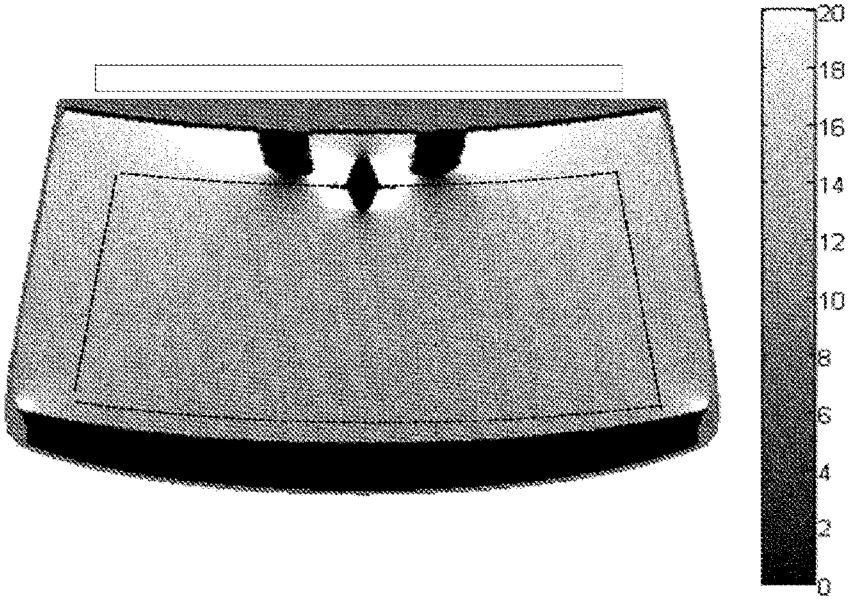
FIG. 4 illustrates the distribution of temperature increase over the windshield from FIG. 2 after a heating time.
Figure 5:
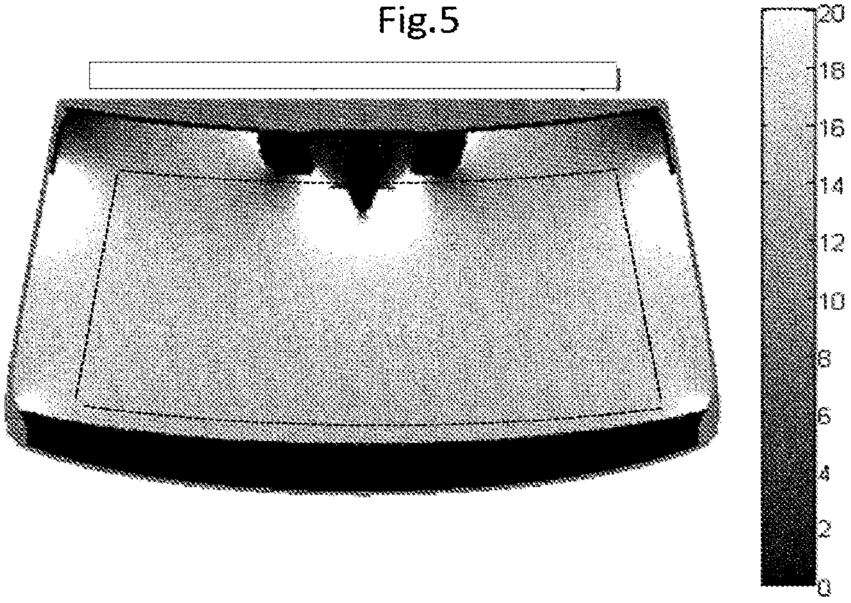
FIG. 5 is analogous to the previous figure for the windshield from FIG. 3.

In the test, the result of which is represented in FIGS. 4 and 5, the temperature variation with respect to the initial temperature is measured over the entire surface of the glazing. This measurement is made after heating for 8 minutes. The temperatures are represented by the degree of gray. The temperature scale is attached to these figures.

The test shows firstly that the area A is lighter for the glazing according to the invention. The temperature difference is around 5° C. higher for the glazing according to the invention. In the same way, generally a temperature increase is observed for the whole of areas A and B.

Figure 6:
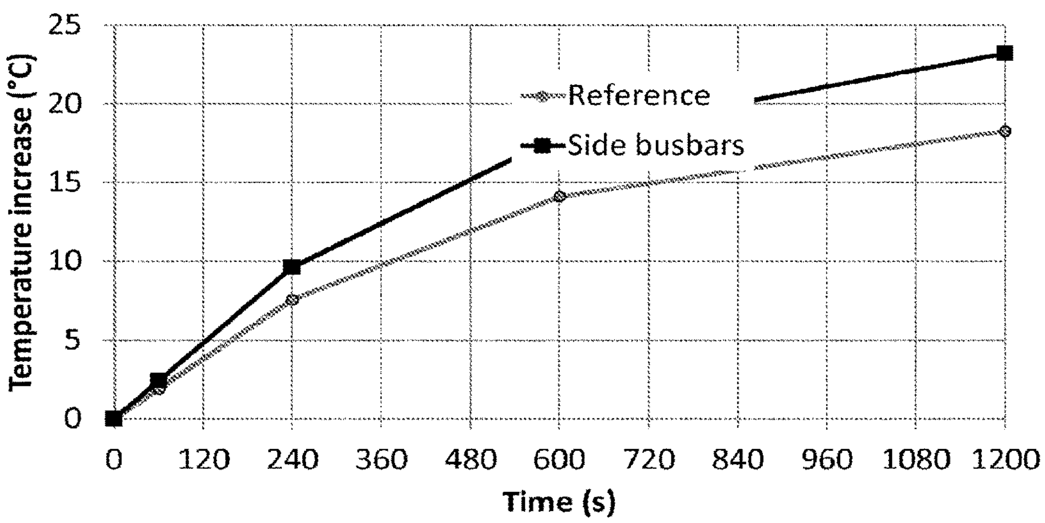
FIG. 6 is a graph representing the average temperature increase for the areas A and B.
Figure 7:
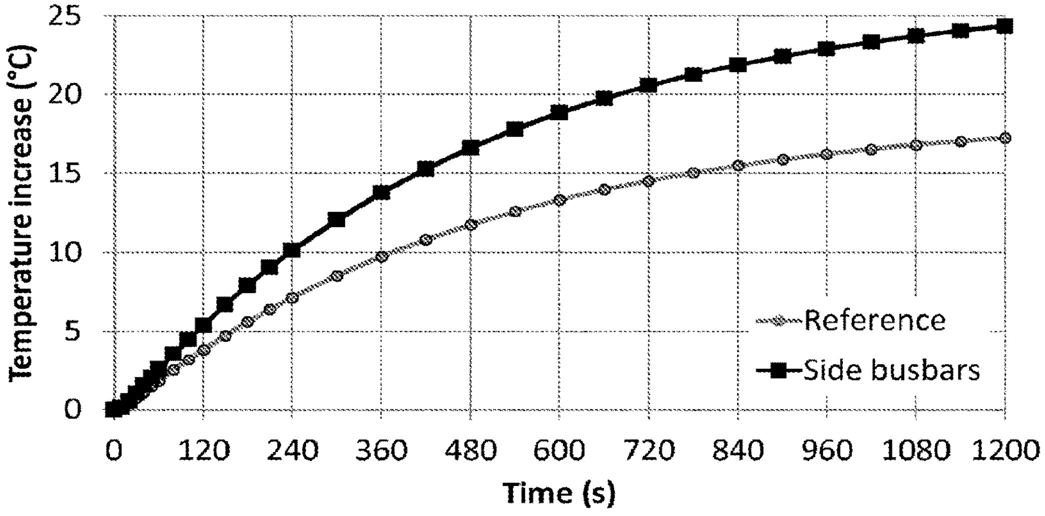
FIG. 7 is a graph analogous to the preceding graph for the temperature increase in the center of the glazing.

FIGS. 6 and 7 establish the change in both cases in the temperature difference over time, on the one hand for the whole of areas A and B, and on the other hand at the center of the windshield. In all cases, the result according to the invention leads to a greater temperature increase.

Additionally, the comparison of FIGS. 4 and 5 shows a lower heating in the case of the invention in the upper portion of the glazing, which is explained without difficulty due to the lesser role of the current lines in this portion, to the advantage of the lines coming from the side busbars 9 and 10.

The structure according to the invention also introduces a modification regarding the location of the hot spots. Unsurprisingly, the end of the side busbars 9 and 10 is the site of hot spots that do not exist in the comparative example. The area located directly beneath the additional busbar 8 is also hotter, and the temperature increase continues beyond this area in order to also improve the temperature at the center of the glazing.

Conversely, the entire portion comprising the windows is substantially colder than in the comparative example. Since the vision in this area is practically zero, a lower temperature has no effect on the expected behavior.

Figure 8:
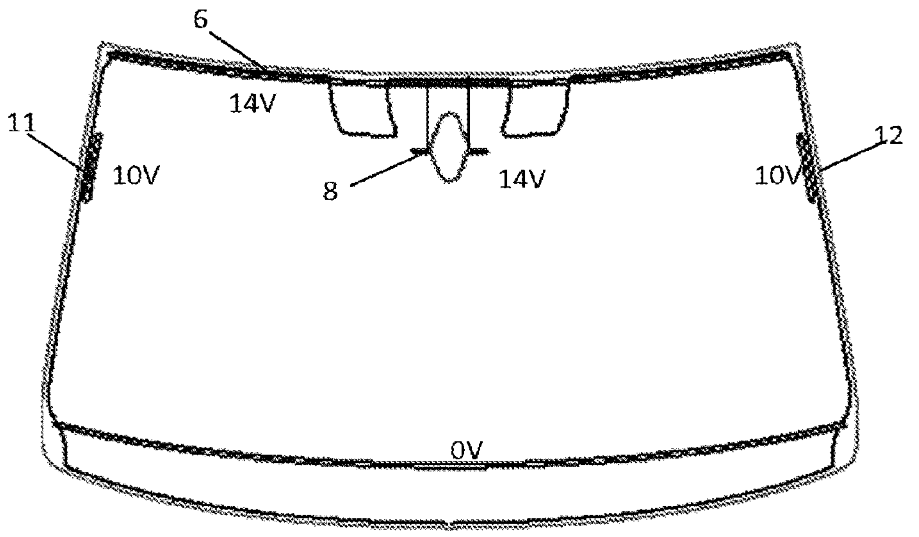
FIG. 8 is a presentation of another embodiment of the invention analogous to FIG. 2 or 3.
Figure 9:
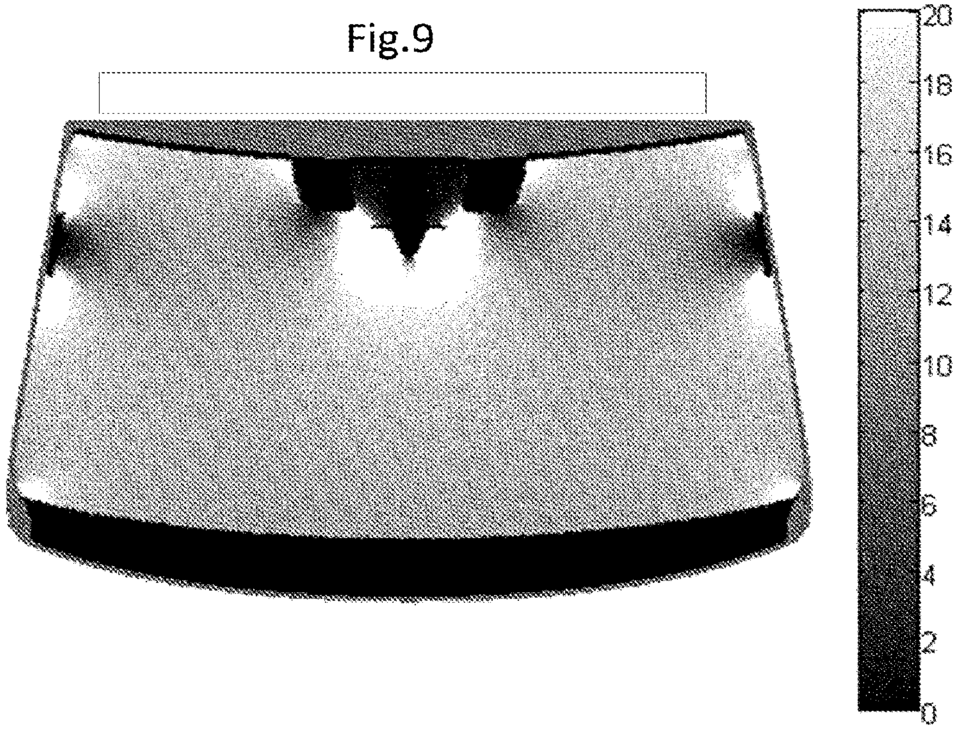
FIG. 9 represents, as in FIGS. 4 and 5, the distribution of temperatures for the embodiment from FIG. 8.

The arrangement of FIG. 8 differs from that of FIG. 3. The side busbar elements 11 and 12 are not directly in the continuity of the busbar 6 but are connected by conductive wires to a power supply, the potential of which is no longer that of the busbar 6. In the height of the windshield, since the ends of the side elements are located lower than the busbar 8, a lower voltage of 10 V is applied. FIG. 9 shows, like for FIG. 5, that the arrangement proposed is substantially more effective than in the comparison mode from FIG. 4.

Figure 10:
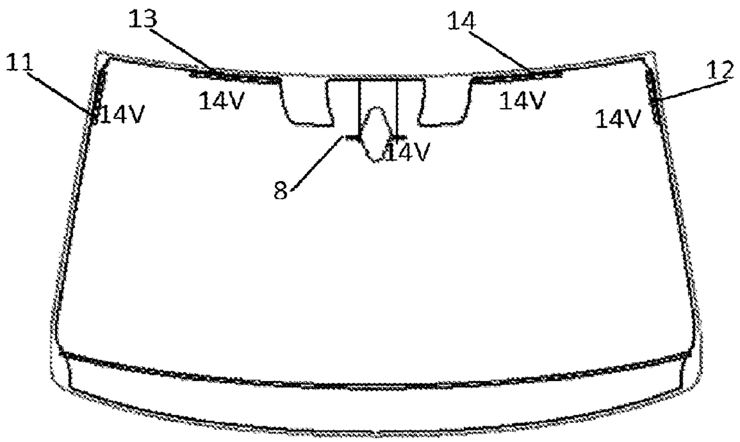
FIG. 10 is a presentation of another embodiment of the invention.
Figure 11:
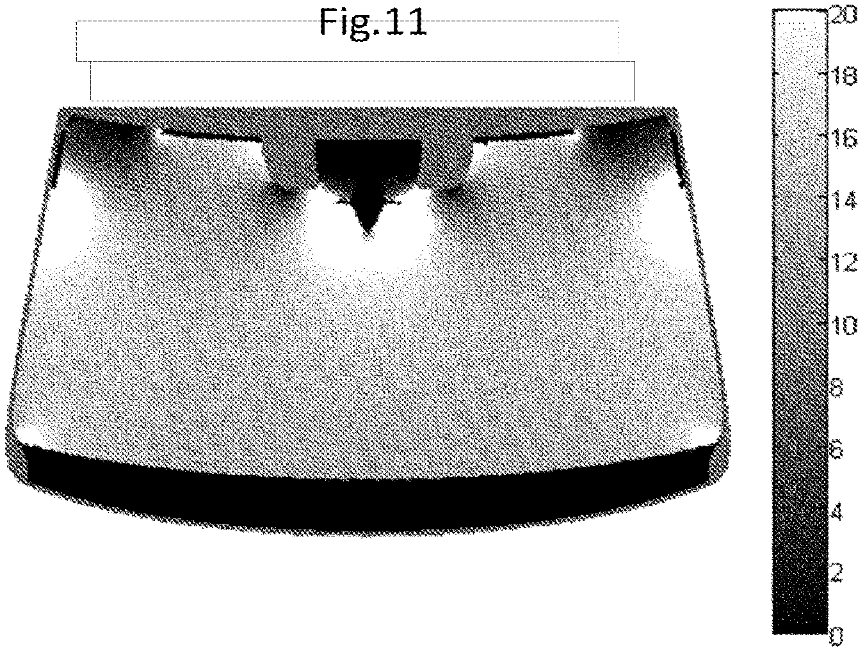
FIG. 11 represents the distribution of temperatures corresponding to the embodiment from FIG. 10.

In the windshield of FIG. 10, all the busbars are again at the same potential of 14 V. In this composition, the busbar bordering the upper edge of the windshield is divided into two portions 13, 14 which do not extend to the side edges. The elements located on the sides have their lower ends more or less level with the busbar 8.

In FIG. 9, it is once again observed that the viewing areas A and even B are better heated than in the comparative FIG. 4. Conversely, the arrangement results in a more limited heating of the upper corners and of the area located above the busbar 8.

The invention claimed is:

1. A heated laminated windshield formed of two glass sheets joined by an interlayer sheet, comprising:

a conductive system of layers covering most of a surface of one glass sheet of the windshield, which system is electrically powered by busbars in a top portion and a bottom portion of the windshield, windows without layers being positioned in the top portion in a middle of the windshield;

at least one additional busbar positioned laterally on an edge and at the top of the windshield, an additional power supply positioned in a form of a power supply busbar located at least beneath widest windows in an area masked by an enamelled coating, wherein the power supply busbar is substantially level with lower ends of the at least one additional busbar.

2. The windshield according to claim 1, comprising two symmetrical additional busbars.

3. The windshield according to claim 1, wherein the one or more busbars extend over edges in a direction of the bottom of the windshield, their lower end being, at most, level with a lower portion of a lowest window.

4. The windshield according to claim 1, wherein the power supply busbar is substantially at a same potential as the at least one additional busbar.

5. The windshield according to claim 1, wherein an end of the at least one additional busbar is, at a lowest point, at a boundary of a viewing area.

6. The windshield according to claim 1, wherein one of the busbars is positioned along an upper edge and is formed of plural separate elements.

7. The windshield according to claim 6, wherein the busbars are formed of metal strips.

8. The windshield according to claim 1, wherein the busbars are formed by conductive pastes printed by screen-printing.

9. A heated laminated windshield, comprising:

two glass sheets;

an interlayer sheet joining the two glass sheets;

a conductive system of layers on a surface of one of the glass sheets of the windshield, which system is electrically powered by busbars in a top portion and a bottom portion of the windshield;

windows without the conductive system of layers positioned in the top portion of the windshield;

at least one additional busbar positioned laterally on an edge and at the top of the windshield; and a power supply busbar located in an area masked by an enamelled coating, wherein the power supply busbar is substantially level with lower ends of the at least one additional busbar.

10. The windshield according to claim 9, comprising two symmetrical additional busbars.

11. The windshield according to claim 9, wherein the one or more busbars extend over edges in a direction of the bottom of the windshield, and lower ends of the one or more busbars extending, at most, level with a lower portion of a lowest window.

12. The windshield according to claim 9, wherein the power supply busbar is substantially at a same potential as the at least one additional busbar.

13. The windshield according to claim 9, wherein an end of the at least one additional busbar is, at a lowest point, at a boundary of a viewing area.

14. The windshield according to claim 9, wherein one of the busbars is positioned along an upper edge and is foHned of plural separate elements.

15. The windshield according to claim 14, wherein the busbars are formed of metal strips.

16. The windshield according to claim 9, wherein the busbars are formed by conductive pastes printed by screen-printing.

* * * * *